Patented Jan. 15, 1935

1,988,125

UNITED STATES PATENT OFFICE 1,988,125

PAINT COMPOSITIONS, ETC.

Cleo H. Kidwell, Dongan Hills, Staten Island, N. Y., assignor, by mesne assignments, to R. T. Vanderbilt Company, New York, N. Y., a corporation of New York No Drawing. Application August 18, 1927, Serial No. 213,977

3 Claims. (Cl. 134—46)

This invention relates to improved magnesium oxide-magnesium chloride compositions particularly adapted for use as stucco paints. It includes compositions marketable in powder form and adapted to be used by adding water as a paint. The new compositions are also of value for use as stucco plastics, having valuable plastic properties.

It has been occasionally suggested that stucco made from mixtures of calcined magnesite, magnesium chloride and an aggregrate could be employed as a stucco paint by adding excess water to the mixture until the proper fluidity was reached. Such unscientific products, however, lack strength, uniformity, resistance to weather and painting consistency, and will frequently shrink, as indicated by warping or cracking, and such products cannot be consistently reproduced of uniform or desirable properties. The failures, inconsistencies and vagaries of stucco made from so-called magnesium oxy-chloride cements are often referred to in the literature and by those in the building trades.

The present invention provides an improved magnesium oxide-magnesium chloride composition which avoids or minimizes the objections and variations, such as those above mentioned, and which has improved properties adapting it for use to particular advantage as a stucco paint.

Having in mind the difficulties met with in so-called magnesium oxy-chloride compositions, I have made a study of the separate components going into the magnesium oxide-magnesium chloride mix, as well as the characteristics of the mix as a whole, and have found that by proper selection of materials and correlating and co-ordinating the different materials in character and amount, it is possible to produce new magnesium oxide-magnesium chloride compositions having valuable properties for use as stucco paints, etc.

I have found it important, in magnesium oxide-magnesium chloride compositions, to maintain a proper balance, as nearly perfect as possible, between the magnesium chloride and the magnesium oxide; but that this balance should be maintained not merely between these two ingredients, but also with reference to the nature, size and amounts of aggregating ingredients admixed therewith. I have also found it important to consider the colloidal and plastic properties of the ingredients and of the mix and to co-ordinate the different ingredients in character and amount to bring the mix as a whole into the proper colloidal or plastic state. I have found that by proper regulation of the ingredients and proportions of ingredients it is possible to produce a composition which will set and dry without objectionable shrinking and cracking and with a regulated time of set which makes it valuable for painting purposes, where the paint may be required to stand for some time after it is mixed and before it is applied to the surfaces to be coated.

In seeking an explanation of the results of my investigation, I have been led to believe that the colloidal behavior of the ingredients of the magnesium oxide-magnesium chloride composition and of the mix as a whole is of primary importance and that for best results the mixture should be made to approach or pass through and to approximate the iso-electric point. The results of my investigations indicate that when the mix is brought to the iso-electric point and then kept on one side or the other of the iso-electric point, a product having the desired valuable plastic properties can be obtained. Magnesia is a basic material, while magnesium chloride is an acidic salt in its reaction toward magnesium oxide and negative fillers; that is, when in solution, $Mg^{++}$ exerts a greater effect than $2 Cl^-$. The fillers commonly employed are usually of a negative character in the presence of water. Accordingly, in compounding the ingredients in making the new composition I take into regard the electrical and colloidal properties of the ingredients and so combine them as to bring about a plastic state in the product which is neither too fluid nor too stiff.

According to one embodiment of the invention, with fillers of a negative character, I add a sufficient amount of magnesium chloride to approximate what appears to be the iso-electric point of the mixture. This amount may be somewhat in excess, or even considerably in excess of the amount which would be used to react or combine with the magnesium oxide.

According to another embodiment of the invention, I add to the mix a small amount of an acid, particularly where the mix is made with a negative filler, and I regulate the amount of the acid to cause the mix to approximate what seems to be the iso-electric point; for example, on adding a small amount of acetic acid gradually to a mix containing magnesium oxide, magnesium chloride and pyrophyllite as a filler, I have observed at a certain point a sudden stiffening of the mass and that by carefully adding a slight excess of the acid the stiffened product could be brought into a desirable plastic condition well adapted for use for painting purposes.

My investigations lead me to believe that the proper combination of ingredients is one in which a deflocculated mixture is flocculated to a regulated extent, which imparts the desired plasticity to the product. This plasticity seems to be attained at a point approximating the point of neutrality or the iso-electric point, but which is on one side or the other of such point. Accordingly, in compounding the new composition, I include therewith an electrolyte of proper type and in proper amount to bring the mix to approximately the iso-electric point, and then, by adding too little or too much, keeping the mix on one side or the other of the iso-electric point to give the best plastic properties. This compounding requires consideration of the properties of the filler, as well as of the magnesia and the magnesium chloride, and, with fillers, the particles of which are negatively charged when suspended in water, a suitable excess of the magnesium chloride may be employed, or a smaller amount of magnesium chloride with the addition of some other electrolyte in proper amount. Among other electrolytes I have found certain acids to have valuable properties for bringing the mix into the proper plastic state.

The action of certain added electrolytes will be illustrated by the following example, the parts being by weight:

A mix was made of the following ingredients,—25 parts of pyrophyllite with particles finer than 40 mesh, 10 parts of air-floated pyrophyllite, 10 parts of coarse calcined magnesite and 14 parts of magnesium chloride, with 17 parts of water. Acetic acid was added gradually to this mix until a sudden stiffening of the mass was noted. By careful regulation of the addition of acetic acid a desirable condition of plasticity of the mix is obtained at a point approximating the point of sudden stiffening. The desirable action seems to be a regulated flocculation of the mix so as to bring the mass into a plastic condition. Other acids, both inorganic and organic, have a similar action in bringing about coagulation. The organic acids, especially tartaric and citric acids, show pronounced results. This is perhaps explainable by the fact that organic anions are strongly adsorbed. In some cases alkalies may be needed to bring the mix to what appears to be the iso-electric point, or to a point approximating that point. When the iso-electric point is reached, as indicated by sudden stiffening of the mix, the greatest plasticity of the mass seems to be obtained by adding a slight excess of the acid or other agent.

I have noticed, however, that even after the greatest plasticity is obtained, with the addition of acids to an alkaline mix, the magnesium oxide has not all been neutralized.

Even without the addition of other electrolytes, such as acids, etc. to the mix, it seems possible to produce a similar result by a regulated balance between the magnesium oxide and magnesium chloride with the type of filler being taken into consideration and its effect allowed for. With fillers whose particles are negatively charged, for example, acting in a similar way to the magnesia, the magnesium chloride should balance not only the magnesia, but also the filler to bring the mix to a proper plastic condition. Where the water employed contains electrolytes, these may require to be taken into consideration.

In the course of my investigations, I have studied the separate components of the magnesium oxide-magnesium chloride mix, as well as the characteristics of the mix as a whole, and I find it important to take into consideration the properties of the different ingredients, as well as the co-ordinating and correlating of the different ingredients in the mix.

The magnesia generally used in so-called magnesium oxychloride compositions is known as calcined magnesite, plastic magnesia, "magnesite" and magnesium oxide. It is commercially obtained by calcination of magnesium carbonate at a temperature of about 700° C. This form is known as light calcined magnesia. This form of magnesia can be employed in the compositions of the present invention, where the advantages resulting from the use of a dense or heavy magnesite are not desired. I find, however, that in order to control, or to assist in controlling, the initial set of the paint produced by mixing the composition with water, it is desirable to employ a magnesia produced by calcination at a higher temperature, either without or with the presence of steam during the calcination. In general, the higher the temperature of calcination, the slower the initial set of the plastic paint. The following tabulation will illustrate how the time of initial set is increased with the temperature of calcination:

| Temperature | Time of calcination | Time of initial set |
|---|---|---|
| 900° C | 15 min. (20 min. to attain the temp.). | 2 hr. 45 min. |
| 950° C | 30 min. (35 min. to attain the temp.). | 3 hr. |
| 1000° C | 30 min. (42 min. to attain the temp.). | 4 hr. 15 min. |
| 1100° C | 30 min. (52 min. to attain the temp.). | 6 hr. |

Other conditions being equal, a higher temperature of calcination has a tendency to prevent shrinkage and consequent cracking and/or warping of the final paint film. It is known that when magnesite is heated to increasing temperatures a change occurs in its specific gravity and its chemical activity. At about 1100° C. or above it becomes nearly inert, and in that condition is employed in refractory linings. Where a slow-setting mixture is desired, a magnesia calcined at a higher temperature can be employed to give such a slow set. The set can also be regulated by using mixtures in different proportions of magnesia produced by calcination at different temperatures, so that some of the magnesia will tend to react or set sooner than the other, and so that the reaction or setting will be prolonged. Magnesia produced by calcination at higher temperatures is known as heavy magnesite. Heavy magnesia can also be prepared from precipitated magnesium hydroxide or carbonate or from other salts such as magnesium oxalate by calcination, but this is a somewhat more expensive method.

The action that magnesia produced by calcination at higher temperatures has toward minimizing shrinkage in the plastic magnesium oxide-magnesium chloride compositions appears to be due to lowered chemical activity. Magnesite calcined at a high temperature does not appear to react as vigorously as the light calcined magnesia with the magnesium chloride, and the plastic mass has accordingly more opportunity to adjust itself to shrinkage and strain. Where the slowing up of the set of the composition is not important, strongly calcined magnesite need not be employed, and ordinary light calcined magnesia can be used and many of the advantages of the invention obtained. Strongly calcined magnesite is, however, of value in slowing up the initial setting time and avoiding cracks in the product under certain conditions.

The use of heavy magnesia, produced by calcining at a high temperature, can be combined with other features of the invention, in which case the regulation of the time of set may be due in part to the heavy magnesia and in part to other features, such as the use of an excess of magnesium chloride ($MgCl_2.6H_2O$) or other electrolyte, as hereinafter described.

Magnesium chloride does not vary a great deal in the standard commercial grades. It should contain less than one percent of salt and of calcium chloride and only a trace of sulphate. In referring to magnesium chloride I refer to the crystalline product with six molecules of water of crystallization ($MgCl_2.6H_2O$), unless otherwise noted.

The reaction which takes place between magnesium oxide and magnesium chloride in magnesium oxide-magnesium chloride compositions does not appear to have been definitely proven. It seems probable that, depending on conditions, several different compounds are formed, containing magnesium oxide, magnesium chloride and water. Variations in these products, as commonly made, may perhaps be explained by the greater or less rapidity of reaction and of crystal formation and of type of crystals formed, due, for example, to a slightly greater ratio of magnesium chloride to magnesium oxide. In such cases a rapid crystal growth and expansion during the initial step might be followed by readjustment and resulting contraction and subsequent cracking.

In determining the proper ratio of magnesium oxide to magnesium chloride, I find it of advantage to form a combination that apparently expands only slightly as the mass goes through the setting period, in order to offset the volume change tending toward contraction that occurs with evaporation of water from the mix.

In making the new composition I control the reaction of magnesium oxide and magnesium chloride as carefully as possible. In some cases I do so by maintaining a definite ratio of one reagent to the other, having regard to the filler employed, and in other cases I control the reaction by the use of temperatures of calcination above 700° C., so as to reduce the activity and grade of reaction and time of setting of the mixture. In other cases I regulate the reaction by the addition of other substances, such as electrolytes, above mentioned, and hereinafter referred to. Combinations of two or more of these methods may be employed.

In referring to magnesium oxide-magnesium chloride, I refer to the indefinite reaction product ($MgO_{(x)}.MgCl_2.H_2O_{(y)}.H_2O_{(z)}$). It is quite possible that this product is unstable, and that its chief function is to assist in the hydrolysis of the magnesium oxide to magnesium hydroxide, in which case the magnesium chloride would play only a temporary role as a member of a reaction product. The fact that the magnesium chloride slowly leaches out of the final product when it is weathered without appreciably lowering resistance of the product to weathering, seems to indicate that some such action occurs.

In making magnesium oxide-magnesium chloride compositions I have also found it important to employ a filler, or fillers, with the particles properly sized to fill all or substantially all the voids. I accomplish this by using different sizes of particles of the same or different fillers, so as to fill as nearly as possible the voids between the particles in a given volume. I find it advantageous to employ particles of graded sizes so that when mixed together there will be a minimum of voids between the particles and so that what space is left between the particles will be in turn filled with the magnesium oxide-magnesium chloride reaction product.

In general, siliceous material, such as silex, may be used. Calcareous materials, such as crystalline limestone, may be used, and other inert filler materials may be used, or mixtures of these various types of fillers may be employed. A mixture of talc and "Asbestine", for example, can be employed. I find it advantageous, however, to use fillers such as micas, fillers of the hydrous magnesium silicate type such as "Asbestine", serpentine and talc, and fillers of the hydrous aluminum silicate type such as kaolin and pyrophyllite. This type of material possesses certain advantages under some conditions.

Pyrophyllite is a particularly advantageous material for use in graded sizes in paint compositions. It is a new material on the market having only recently been produced to any extent commercially. It acts as a "smoother" in the painting operation by influencing the yield value and mobility of the paint. This material also possesses the quality of elasticity, thus offsetting to a degree the stress-strain of the mixture.

The sizing of the filler is particularly important. The problem is related to that of the sizing of the aggregate in a stucco or flooring composition, but is different therefrom because of the greater fineness of particle size necessary to obtain proper painting properties. It follows from this fact alone that the mere thinning of a stucco mix with water will not produce a paint having proper painting properties. The particles will be too coarse to apply with a brush and give it smooth surface, but would leave a rough surface.

Accordingly in forming the new paint composition, I not only use fine particles of the filler, but I use graded sizes of the particles and provide for filling the voids as much as possible, in order that the minimum amount of magnesium oxychloride can be employed. This has an important bearing not only on the prevention of cracks when the product sets, but also on strength. By leaving a minimum space of voids to be filled with the magnesium oxide-magnesium chloride, the amount of water to be evaporated is reduced, the amount of crystal formation is reduced and the shrinkage due to volume changes of magnesium oxide-magnesium chloride and evaporation of water is reduced to a minimum. Magnesium oxide-magnesium chloride has less strength in thick layers or thick films than it has in thin films. By using fillers which leave only the minimum space between particles to be filled with the magnesium-oxychloride, a result similar to that of the glue-joint principle is obtained in binding the filler particles together.

As previously mentioned, the mere thinning of a magnesium oxide-magnesium chloride filler mixture with water does not convert a stucco mixture into a paint. In order that the composition may have proper painting qualities, I not only regulate the filler to give a proper ratio of filler to vehicle, but I regulate the viscosity, yield value and mobility of the product and the force of flocculation in the filler-vehicle system, as well as the consistency.

I control the consistency of the magnesium oxide-magnesium chloride composition in part by governing the force of flocculation in the filler-magnesium oxide-magnesium chloride system. As above stated, my investigations indicate that flocculation depends upon the electrical charges carried by the particles of the various ingredients. Pyrophyllite of the particle size employed, when suspended in water, is a negative colloid, and is well dispersed. Magnesia, such as I employ, possesses a certain amount of plasticity, is colloidal to a certain degree when suspended in water, and is alkaline. Accordingly, when magnesia is added to a water suspension of pyrophyllite, it tends to peptize it and to further disperse it to a still more highly colloidal state on account of the action of the hydroxyl ion from the magnesium oxide. A water suspension of pyrophyllite and magnesium oxide is, therefore, highly colloidal and sticky. In some cases, the amount of water that is to be used in the composition will not be sufficient, without the presence of magnesium chloride, even to wet the mixture. When, however, a weak magnesium chloride solution, such as a solution of 15° Baumé is gradually added to the suspension of magnesium oxide and pyrophyllite in water, the magnesium ion with its positive valence of two, neutralizes some of the negative charges on the magnesium oxide and pyrophyllite particles and gradually increases the force of flocculation as more magnesium chloride is added. The colloidal particles of pyrophyllite adsorb the positive ions and become wetted and flocculated. At a given concentration of magnesium chloride the whole mass becomes plastic. If this mixture, with its large excess water, is spread as a paint on a surface, it will shrink and crack because the highly colloidal mix retains so much water that when the water evaporates the film shrinks.

If, however, a solution of magnesium chloride which is too strong is used, the force of flocculation will be so far reduced that the mixture will lose plasticity and become stringy. It will not then serve as a paint and will contain so much excess magnesium chloride that the chloride will leach out on weathering to such an extent that the paint will soon disintegrate. It is important, therefore, to regulate not only the amount of magnesium chloride but also the amount of water. When the composition is compounded in a dry state, the proper amount of magnesium chloride can readily be compounded, and in that case the dissolving of the magnesium chloride will take place when the water is added; and the mixture will be so compounded that when the proper amount of water is added it will have the proper consistency. I use such an amount of magnesium chloride as will bring about flocculation of the particles and produce a plastic condition, which appears to be at a point approximating, but somewhat away from the iso-electric point, as hereinbefore explained.

Other electrolytes than an excess of magnesium chloride similarly affect the plasticity of the magnesium oxide-magnesium chloride-filler mixes. If, for example, acetic acid solution is added gradually to such a mix, the mass first becomes very stiff, then plastic and at last almost watery. As organic anions are strongly adsorbed by the pyrophyllite the coagulating action of the hydrogen ion is partly counter-balanced by the great adsorption and consequent peptization of the acetic acid radical, which is negative. When the pyrophyllite ceases to adsorb the negative acid radical, the negative charges on the particles of pyrophyllite are neutralized and the particles become flocculated until the mass becomes stringy and loses most of its plasticity. In extreme cases, such as occur upon the addition of excess citric acid, the mass passes the point of electric neutrality, the iso-electric point and the charge on the particles becomes positive. The mass becomes again plastic and assumes a certain stability. In this condition no setting up of the mass occurs for an indefinite period. Thus the time of setting may be controlled by the addition of the proper amount of an ingredient carrying the proper electrical charge; but the amount should be regulated with reference to the condition of neutrality or plasticity to give a condition of plasticity. Large amounts of magnesium chloride will also slow up the set of the magnesium oxide-magnesium chloride-filler mixture.

Different fillers will require different amounts of magnesium chloride or other flocculating agent. In general, a material having less negative charges on its particles would require less of the flocculating agent to produce the best painting consistency in the mass and vice versa.

From the considerations above mentioned it will be evident that if the quantity of magnesium oxide and filler remain constant, there is needed a fairly definite quantity of magnesium chloride or other flocculating agent, or both, to bring the mass to the proper painting consistency and to control the time of initial set. The latter is important, because if too small a quantity of magnesium chloride is added, the mass will set up in the container when water is added before there is time to apply the paint. By regulating the amount of magnesium chloride so that, in the case of a dry mix, only the addition of water by the user will be necessary, the time of set can be regulated so as to prevent too quick setting and to permit the paint to be applied at the convenience of the painter. In general, the paint composition should have a proper painting consistency, resist weathering and be capable of standing a considerable time, for example, about four hours, before initial set begins. This proper painting consistency, as well as the avoidance of shrinking and cracking, and the regulation of the initial set of the magnesium oxide-magnesium chloride paint, depends largely upon the governing of the force of flocculation between the magnesium oxide, magnesium chloride and filler particles, as well as upon the particle size of the filler.

In using pyrophyllite I have found it of advantage to divide the material into different sizes, for example, 40 to 80 mesh, 80 to 120 mesh, 120 to 200 mesh, 200 to 325 mesh, under 325 mesh and air-floated. I have also found it of advantage to combine these different sizes in approximately the following proportions:

| | Percent |
|---|---|
| 40–80 mesh | 36.21 |
| 80–120 mesh | 16.46 |
| 120–200 mesh | 9.97 |
| 200–325 mesh | 5.51 |
| 325–finer mesh | 2.89 |
| Air-floated passing 325 and up to colloidal size | 28.96 |
| | 100.00 | is also desirable, for example, passing 100 mesh. A sample screen analysis of Indian magnesite would be as follows:

|  | Percent |
|---|---|
| 60–120 mesh | 8.0 |
| 120–200 mesh | 11.2 |
| 200–270 mesh | 13.2 |
| 270–325 mesh | 6.4 |
| 325–finer mesh | 56.0 |
|  | 94.8 |
| Loss in analysis | 5.2 |
|  | 100.0 |

The following mix will further illustrate the invention, this mix giving good results for painting surfaces, and having a consistency well adapted for that purpose. The parts are by weight.

| Parts pyrophyllite | | Per cent by wt. of total mix |
|---|---|---|
| 12.5 | 40–80 mesh | 16.22 |
| 5.68 | 80–120 mesh | 7.32 |
| 3.44 | 120–200 mesh | 4.43 |
| 1.9 | 200–325 mesh | 2.42 |
| 1.0 | 325–finer mesh | 1.29 |
| 10.0 | air-floated from 325 mesh to colloidal | 12.90 |
| 34.52 | total aggregate or filler | 44.58 |
| 10.00 | magnesia (MgO) (Indian magnesite) | 23.82 |
| 18.5 | magnesium chloride fused, powdered MgCl$_2$.5.83H$_2$O | 18.70 |
| 14.5 | water, distilled | 12.90 |
| 77.52 | total weight | 100.00 |

The following composition also gives excellent results, differing from the above mainly in the sizing of the pyrophyllite and in the quantity of water:

| Parts pyrophyllite | | Per cent by wt. of total mix |
|---|---|---|
| 7.5 | 40–80 mesh | 9.38 |
| 1.0 | 80–120 mesh | 1.25 |
| 3.2 | 120–200 mesh | 4.0 |
| 7.0 | 200–325 mesh | 8.75 |
| 6.3 | 325–finer mesh | 7.87 |
| 10.0 | air-floated; from 325 mesh to colloidal | 12.50 |
| 35.0 | total aggregate | |
| 10.0 | magnesia (MgO) | 12.50 |
| 19.0 | magnesium chloride fused, powdered MgCl$_2$5.83H$_2$O | 23.75 |
| 16.0 | water, distilled | 20.00 |
| 80.0 | total weight | 100.00 |

This composition possessed not only good painting properties, but also freedom from objectionable shrinking and cracking. If, in the above compositions, an insufficient amount of magnesium chloride had been employed, and the mix otherwise made the same except for the magnesium chloride and water, shrinking and cracking will take place. For example, using 14 instead of 19 parts of magnesium chloride and 16 instead of 17 parts of water, gave a mixture which, when applied on surfaces, shrank badly and cracked badly. The explanation of this seems to be that there was not enough positive magnesium ions supplied by the magnesium chloride to neutralize the negative charges of the pyrophyllite, and flocculate it to an extent sufficient to prevent shrinking. On the other hand, by using 27 parts of magnesium chloride instead of 19 in the above mix, and 12 parts of water instead of 16, a mix was obtained which, when applied as a paint did not crack or shrink, and much less water could be employed, which favors the prevention of shrinking due to evaporation of water. This mixture, however, is not the best to resist weathering, since more chloride is present than necessary and a considerable quantity of it leaches out upon weathering. For practical purposes, the amount last mentioned represents the upper limit, and it is advantageously lower than that, for example, as shown in the above formula.

In the composition of the above examples, the ordinary magnesia is employed, produced by calcination at temperatures around 700 to 750° C. Where a slower setting product is desired, magnesium oxide calcined at a higher temperature can be employed in these same compositions, in similar amount, for example, magnesia calcined at a temperature of 900 to 1100° C. or above.

In general, in compounding the new megnesium oxide-magnesium chloride composition, I first determine or calculate for a given filler the quantities of the various sizes to employ to fill as nearly as possible the voids between the particles in a given volume. I then calculate the quantity of magnesium oxide necessary to fill the voids still remaining between the particles of filler. I then figure out the quantity of magnesium chloride or other electrolyte necessary to neutralize a sufficient number of the charges of the particles of the filler and magnesium oxide to produce a proper degree of plasticity and painting consistency. The magnesium chloride should be sufficient to bring about the desired reaction with the magnesia, and may be used in larger amounts, or may be used with other electrolytes. It will be evident that different fillers will vary somewhat from each other and will require different amounts of electrolytes to flocculate them.

The new composition can advantageously be prepared in dry form by compounding the ingredients in proper proportion, so that when water is added to give a mixture of proper painting consistency it will otherwise be of proper composition to give a paint having improved properties.

The new composition, while particularly valuable for painting purposes, can also be employed for mixture with coarser materials for use as a plastic.

I claim:

1. A magnesium oxide-magnesium chloride composition which, with the addition of water, yields a product adapted for painting which will set and dry without objectionable shrinking and cracking comprising magnesium oxide, megnesium chloride and pyrophyllite.

2. A megnesium oxide-magnesium chloride composition which, with the addition of water, yields a product adapted for painting which will set and dry without objectionable shrinking and cracking comprising magnesium oxide, magnesium chloride and pyrophyllite, the pyrophyllite being in the form of particles of varying sizes so proportioned as to substantially fill the voids between each other and the magnesium oxide being proportioned to substantially fill the voids between the particles of the pyrophyllite.

In using magnesium oxide a fine particle size

3. A magnesium oxide-magnesium chloride composition which, with the addition of water, yields a product adapted for painting which will set and dry without objectionable shrinking and cracking comprising magnesium oxide, magnesium chloride and pyrophyllite, the pyrophyllite being in the form of particles of varying sizes so proportioned as to substantially fill the voids between each other and the magnesium oxide being proportioned to substantially fill the voids between the particles of the pyrophyllite, and a sufficient amount of suitable electrolytes being present to give a plastic painting consistency to the mixture when water is used.

CLEO H. KIDWELL.

CERTIFICATE OF CORRECTION.

Patent No. 1,988,125.                                                            January 15, 1935.

CLEO H. KIDWELL.

It is hereby certified that error appears in the printed specification of the above numbered patent requiring correction as follows: Page 3, second column, line 11, for "material" read materials; page 5, first column, line 58, before the "5" in center of formula, insert a period; same page, second column, lines 62 and 64, claims 1 and 2 respectively, for "megnesium" read magnesium; and line 75, strike out the words "In using magnesium oxide a fine particle size" and insert the same as line 1, of first column, of said page 5; and that the said Letters Patent should be read with these corrections therein that the same may conform to the record of the case in the Patent Office.

Signed and sealed this 12th day of March, A. D. 1935.

(Seal)

Leslie Frazer
Acting Commissioner of Patents.